O. HORAK.
ELECTRICALLY OPERATED CAR COUPLING MECHANISM.
APPLICATION FILED AUG. 4, 1921.
1,414,187.
Patented Apr. 25, 1922.
3 SHEETS—SHEET 3.
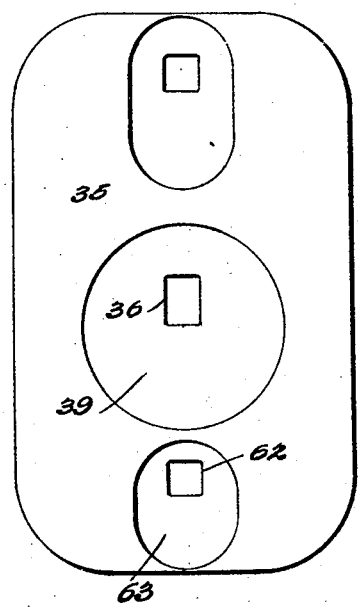
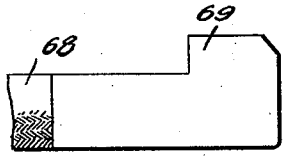
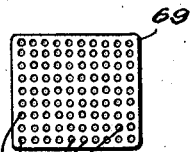
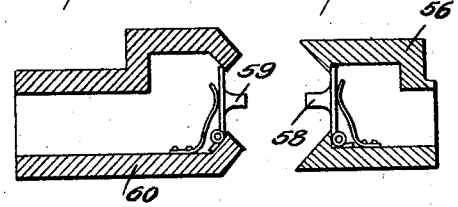
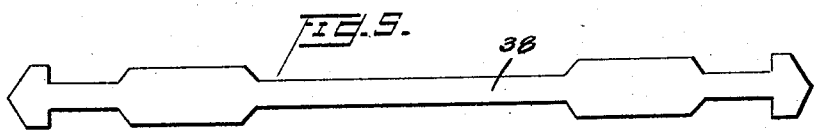
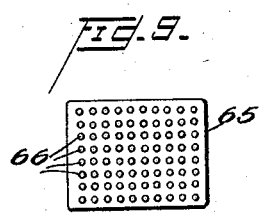
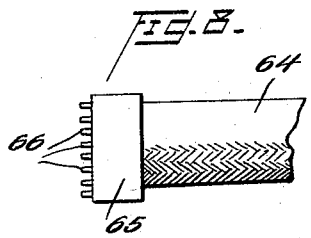
Inventor
Otto Horak
By J. K. Bryant
Attorney

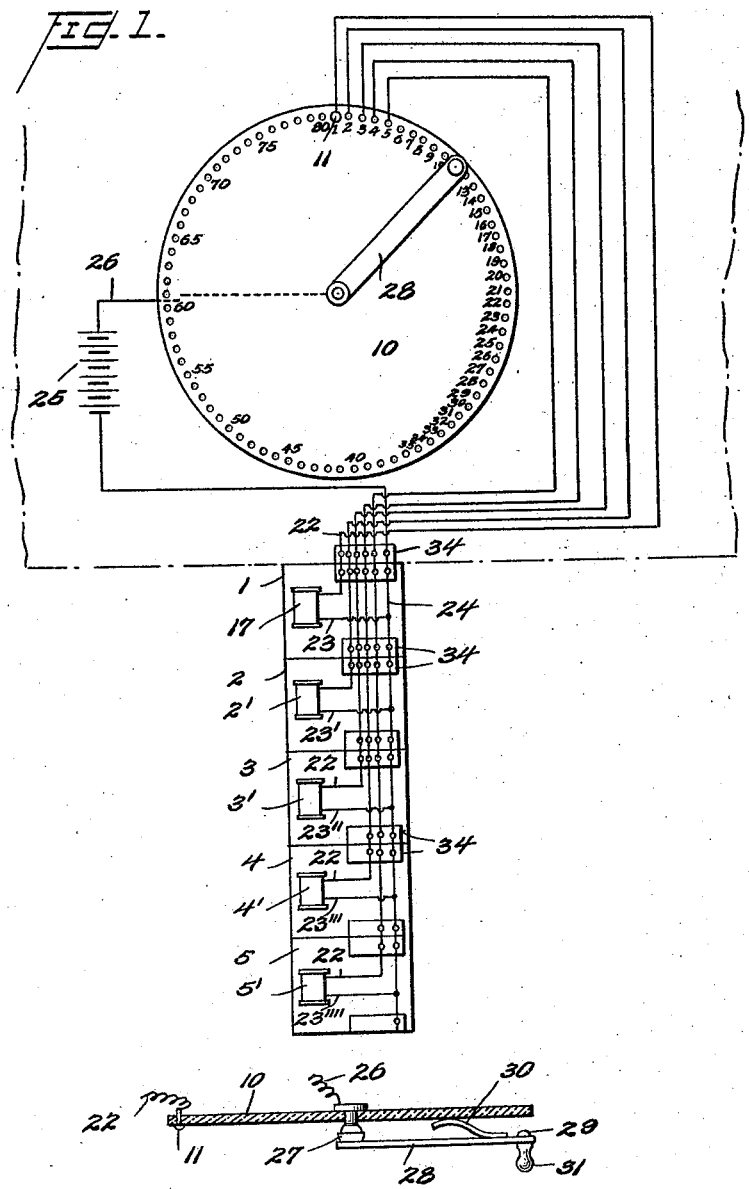

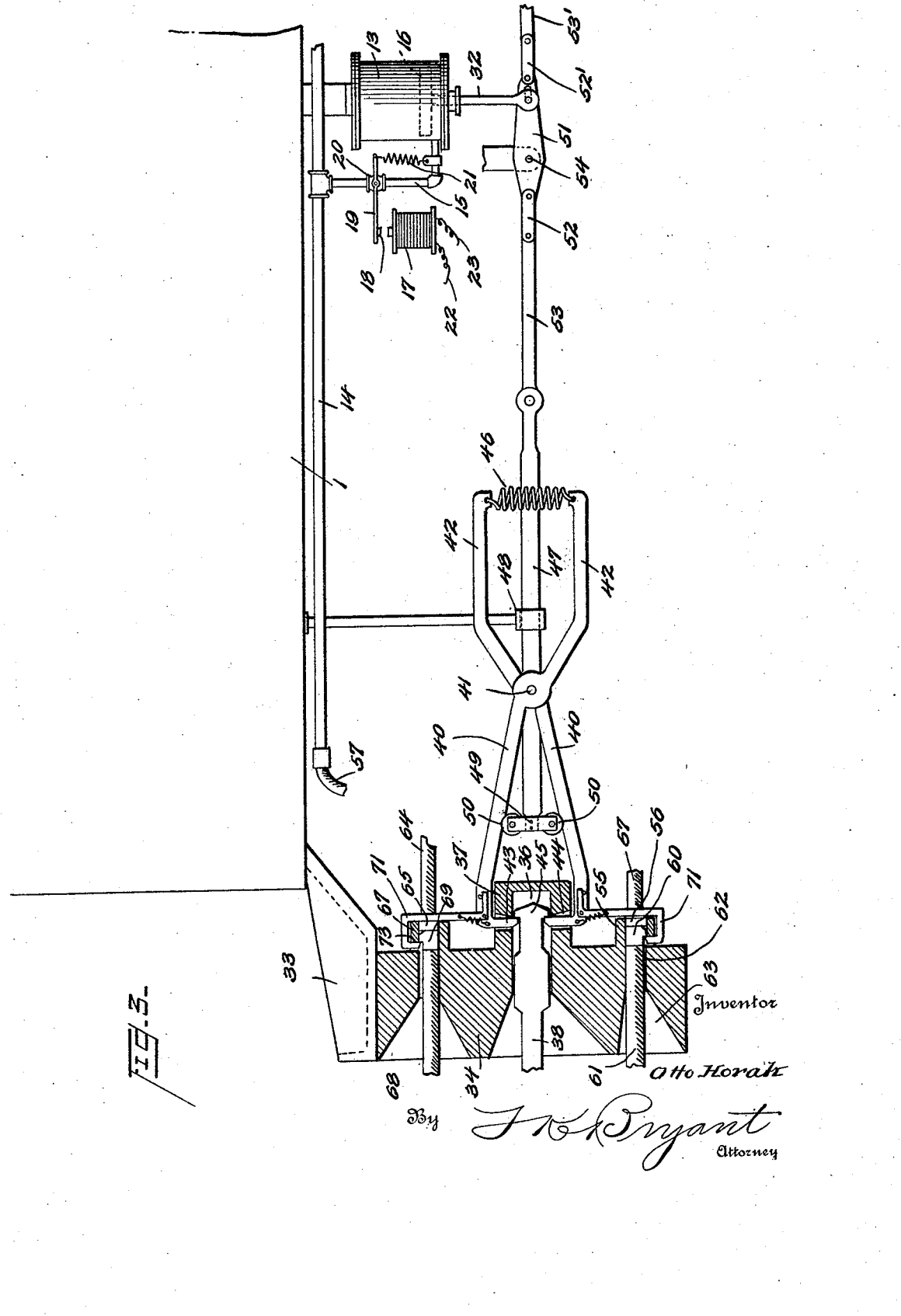

UNITED STATES PATENT OFFICE.

OTTO HORAK, OF ST. LOUIS, MISSOURI.

ELECTRICALLY-OPERATED CAR-COUPLING MECHANISM.

1,414,187.   Specification of Letters Patent.   Patented Apr. 25, 1922.

Application filed August 4, 1921. Serial No. 489,920.

*To all whom it may concern:*

Be it known that I, OTTO HORAK, a citizen of Czechoslovakia, residing at St. Louis, in the county of St. Louis City and State of Missouri, have invented certain new and useful Improvements in Electrically-Operated Car-Coupling Mechanism, of which the following is a specification.

The primary object of the invention is the provision of electrical control mechanism adapted to be carried in the engineer's cab for releasing all the couplings of a desired car in the train simultaneously and at the will of the engineer.

A further object of the invention is the provision of mechanism upon a railroad car adapted for releasing the coupling means for the car as well as the pipe and wire cable connections of the train line control thereof being effected selectively by mechanism within the cab of the locomotive.

A still further object of the invention is the provision of means whereby the engineer upon the locomotive may readily uncouple any car of a train by pressing the button upon the instrument board in the locomotive, all of the connections such as the cable and pipe lines as well as the coupling connections between the cars being instantly and simultaneously released for the car designated.

With these general objects in view and others that will appear as the nature of the invention is better understood, the same consists in the novel construction, combination, and arrangement of parts hereinafter more fully described, illustrated in the accompanying drawings, and pointed out in the appended claim.

In the drawings forming a part of this application, and in which like designating characters refer to corresponding parts throughout the several views, Figure 1 is a diagrammatic view of the wiring for the electrical circuits employed in connection with a locomotive and five cars of a train, Figure 2 is a diametrical sectional view taken through the selective switch employed in the system, Figure 3 is a view partly in elevation and partly in section showing the arrangement of mechanism carried by each car, Figure 4 is a front elevation of the coupling head block provided at the ends of the cars, Figure 5 is a side elevation of the coupling bar employed between the cars, Figure 6 is a side elevation of a head of the electrical cable, Figure 7 is an end elevation thereof showing the receiving sockets, Figure 8 is a side elevation showing the coupler plate and its plugs attached to a portion of the cable, Figure 9 is an end elevation of the plug plate, Figure 10 is a sectional view of the head for hose, either steam or air, and Figure 11 is a similar view of the hose plate carried by the coupler block shown in Figure 4.

It will first be understood that a dial or switch plate 10 is provided in the locomotive cab of the train employing my invention and that a contact point 11 is provided upon the plate for the total number of cars that may be connected in a train and brought under the control of the system. Each car such as 1 illustrated in Figure 3 of the drawings is provided with an operating cylinder 13 having an end portion thereof in communication with the steam pipe 14 upon the train by means of a pipe 15 while a piston 16 in the cylinder 13 is adapted to be elevated by such introduction of steam to the cylinder 13.

An electro-magnet 17 is carried by each car having its armature 18 carried by the operating lever or stem 19 of the controlling valve 20 in the pipe 15. A spring 21 normally holds the valve 20 closed but upon energizing the magnet, 17, the armature 18 is attracted and the valve stem 19 shifted for opening the valve 20 against the action of the spring 21 thereby permitting steam to enter the lower end of the cylinder 13 and elevate the piston 16.

One wire 22 of the electromagnet 17 runs through the car coupling hereinafter described and is electrically connected to one of the contact points 11 such as that shown at position 1 in Figure 1 of the drawings. The other or return wire 23 of the electromagnet 17 is connected to a common return 24 extending throughout the train and connected to one pole of a battery 25 while the other pole of the battery is electrically connected by a wire 26 with the axis 27 of the switch lever 28 upon the switch plate 10.

The outer end of the lever 28 has a contact point 29 normally spaced from the contact points 11 by means of a spring 30 carried by the lever 28 and at all times resiliently bearing upon the plate 10. A handle 31 upon the lever 28 is readily grasped in turning the switch lever for bringing the contact 29 into engagement with the desired button or contact 11 upon depressing the outer end of the lever 28 against the spring 30, it being understood that the mounting connection 27 is a flexible as well as a pivotal one. Each car of the train is provided with the mechanism illustrated in Figure 3 of the drawings, and the number of cars to be accommodated by the system is equal to the number of contact points 11 upon the switch plate 10, the wiring of other cars such as 2, 3, 4 and 5 is diagrammatically illustrated in Figure 1 of the drawings and upon which the electromagnets 2′, 3′, 4′ and 5′ respectively are installed. These last named electromagnets are connected to the return wire 24 by wires 23′, 23″, 23‴, 23⁗, respectively. The magnets 2′, 3′, 4′, and 5′ are connected to the contact points 11 of the plate 10 at the posts 2, 3, 4 and 5, respectively but other wires 22 in identical manner to that heretofore described in connection with the electromagnet 17 of car 1.

From this detailed description it will be apparent that by grasping the handle 31 of the rotary switch plate 10 located in the cab of the locomotive, the electromagnet upon any desired car of the train may be instantly energized by closing the circuit of the battery 25 by connecting the contact point 29 of the switch member 28 with the contact point 11 on the plate 10 which is electrically connected to the electromagnet of the car desired by one of the wires 22 as heretofore set forth. Further, such operation of the switch lever 28 opens the valve 20 of the desired car and causes the piston 16 to elevate drawing the rod 32 thereof upwardly.

A coupling head 33 is carried at each end of the railway cars provided with a block 34 having its outer face 35 provided with a rectangular central socket 36 in a rearwardly projecting portion 37 of said block 34. A coupling bar 38 illustrated in Figure 5 of the drawings is adapted to enter the open outer end of the socket 36 through the flared entrance 39 of the casing. A pair of hooks 40 pivoted together at 41 after the manner of a pair of tongs with handle portions 42 as the free ends 43 of the hooks normally projecting through perforations 44, in the top and bottom of the projecting portion 37 for engaging behind the head 45 of the connecting bar 38 when said head is positioned in the socket 36. A spring 46 connects the free ends of handles 42 together for normally closing the hooks 40.

The coupling hooks 40 are suspended from the car 1 in any desired manner and are adapted to be released by means of a longitudinally shiftable rod 47 slidably mounted in a hanger 48 and having a cross head 49 provided with rollers 50 in the opposite ends thereof for riding upon the inner edges of the hooks 40. The rear end of the rod 47 is pivotally connected to a rocker 51 by means of links 52 and 53 while the rocker 51 which is pivoted at 54 to any suitable support beneath the car 1 has its free end loosely pivoted to the lower end of the piston rod 32. It will be apparent that upon operating the piston 16, the upward movement of the piston rod 32 pivotally moves the rocker 51 drawing the links 52 and 53 as well as the rod 47 inwardly beneath the car which separates the hooks 40 and releases the coupling bar 38. The electrical means actuated from the cab of the locomotive by means of the switch lever 28 has been already fully described so that the operation of releasing the coupling bar 38 of any car in the train at the will of the engineer will be at once apparent. The coupling mechanism illustrated in Figure 3 is duplicated at the opposite end of the car and its operation is identical, links 52′ and 53′ being indicated in Figure 3 for operating similar to the links 52 and 53.

The coupler block 34 has a socket member 55 adjacent the projecting portion 37 with a head 56 to which the pipe line of the car for any desired fluid is attached such as the hose 57. The head 56 has an inwardly opening valve 58 normally closed by the pressure of the fluid and adapted to cooperate with a similar valve 59 in a head 60 of a coupling section of pipe 61 adapted to be inserted and withdrawn from the bore 62 of the socket member 55, the outer portion of the bore having a flared entrance 63.

The electric wires employed upon the train are in the form of a cable 64 having a plate 67 at one end with a separate plug 66 for each wire of the cable.

The plate 65 is positioned for closing the inner end of a socket member 67 similar to the socket 55 while a cable member 68 for completing the connection has a head 69 for reception within the socket 67. Recesses or sockets 70 in the head 69 receive the plugs 66 for electrically connecting the wires of the cable members 64 and 68 when the head 69 is coupled to the plate 65. An auxiliary hook 71 is pivoted to each hook member 40 and has a normal positioning spring 72, hook 71 extending through perforations 73 in the socket members 55 and 65 for engaging the heads 60 and 69 respectively as illustrated in Figure 3. It will be apparent that when the hooks 40 are separated by the head 49 and the hooks thereby released, the auxiliary hooks 71 are simultaneously moved away from each other and released from the hose head 60 and the cable head 69.

In this manner, the electrical wires upon the train may be all disconnected at will and also the pipe lines for the fuel upon the train and simultaneously with the release of the coupling bar between the cars. The mechanism being released in this manner from the locomotive cab by the engineer, the remainder of the train may proceed leaving behind the car which has been detached, it being apparent that the bringing together of two cars provided with the coupling mechanism disclosed will result in the automatic coupling of the cars as well as the pipe and cable lines. The management of long trains is facilitated by this invention, any number of cars being accommodated by the provision of as many contact points 11 upon the plate 10 as there are cars in the train.

While the form of the invention herein shown and described is what is believed to be the preferred embodiment thereof, it is nevertheless to be understood that various forms, modifications and arrangements of the parts may be made without departing from the spirit and scope of the invention as claimed.

I claim:—

A device of the class described comprising a switch plate for a locomotive provided with a plurality of contacts, a switch lever pivoted to said plate adapted for closing the electrical circuit with any switch contact desired, an electro-magnet upon each car of the train in circuit selectively with one of said switch contacts, main couplings for each car, articulated releasing means for the couplings of each car, electrically-controlled actuating means for said articulated means in electrical circuit with said electro-magnets, steam pipe and circuit wire couplings for each car and retaining hooks for said last-named couplings carried by said main couplings and adapted for actuation therewith.

In testimony whereof I affix my signature.

OTTO HORAK.